United States Patent
Swantick et al.

(10) Patent No.: US 10,071,777 B2
(45) Date of Patent: Sep. 11, 2018

(54) AERODYNAMIC ACTUATOR CONTROL SYSTEMS AND METHODS

(71) Applicant: GM Global Technology Operations LLC, Detroit, MI (US)

(72) Inventors: Braden J. Swantick, Livonia, MI (US); Edward T. Heil, Howell, MI (US); Kevin Irwin, Royal Oak, MI (US); Jeffrey A. Mosher, West Bloomfield, MI (US); Hualin Tan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 98 days.

(21) Appl. No.: 15/334,700

(22) Filed: Oct. 26, 2016

(65) Prior Publication Data
US 2018/0111650 A1 Apr. 26, 2018

(51) Int. Cl.
*B62D 37/02* (2006.01)
*B62D 35/00* (2006.01)

(52) U.S. Cl.
CPC .......... *B62D 37/02* (2013.01); *B62D 35/005* (2013.01); *B62D 35/007* (2013.01)

(58) Field of Classification Search
CPC ..... B62D 37/02; B62D 35/007; B62D 35/005
USPC .......................................................... 701/49
See application file for complete search history.

(56) References Cited

PUBLICATIONS

U.S. Appl. No. 15/093,071, filed Apr. 7, 2016, Edward T. Heil et al.

*Primary Examiner* — Brian P Sweeney

(57) ABSTRACT

An aerodynamic control system of a vehicle includes a utilization module that, based on a longitudinal force on a tire in a longitudinal direction and a latitudinal force on the tire in a latitudinal direction, determines a utilization force on the tire of the vehicle and a direction of the utilization force. A maximum module, based on the direction of the utilization force, determines a maximum force of the tire for maintaining traction between the tire and a road surface contacting the tire. A difference module determines a difference between the utilization force on the tire of the vehicle and the maximum force on the tire. An aerodynamic actuator control module selectively adjusts a position of an aerodynamic actuator of the vehicle based on the difference.

20 Claims, 4 Drawing Sheets

AERODYNAMIC ACTUATOR CONTROL SYSTEMS AND METHODS

CROSS-REFERENCE TO RELATED APPLICATIONS

This application is related to U.S. patent application Ser. No. 15/093,071 filed on Apr. 7, 2016. The entire disclosure of the above application is incorporated herein by reference.

FIELD

The present disclosure relates to aerodynamics of a vehicle and more specifically to systems and methods for controlling aerodynamic actuators of a vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces torque. In some types of engines, air flow into the engine may be regulated via a throttle. The throttle may adjust throttle area, which increases or decreases air flow into the engine. As the throttle area increases, the air flow into the engine increases.

A fuel control system adjusts the rate that fuel is injected to provide a desired air/fuel mixture to the cylinders and/or to achieve a requested amount of torque. Increasing the amount of air and fuel provided to the cylinders generally increases the torque output of the engine. The engine outputs torque to wheels through a transmission.

SUMMARY

In a feature, an aerodynamic control system of a vehicle is described. A utilization module, based on a longitudinal force on a tire in a longitudinal direction and a latitudinal force on the tire in a latitudinal direction, determines a utilization force on the tire of the vehicle and a direction of the utilization force. A maximum module, based on the direction of the utilization force, determines a maximum force of the tire for maintaining traction between the tire and a road surface contacting the tire. A difference module determines a difference between the utilization force on the tire of the vehicle and the maximum force on the tire. An aerodynamic actuator control module selectively adjusts a position of an aerodynamic actuator of the vehicle based on the difference.

In further features, the actuator control module adjusts the position of the aerodynamic actuator toward a fully open position when the difference indicates that the utilization force on the tire is greater than the maximum force of the tire, and the aerodynamic actuator increases downforce on the tire when the position of the aerodynamic actuator moves toward the fully open position.

In further features, the actuator control module adjusts the position of the aerodynamic actuator toward a closed position when the difference indicates that the maximum force of the tire is greater than the utilization force of the tire, and the actuator decreases downforce on the tire when the position of the aerodynamic actuator moves toward the closed position.

In further features, the tire is a front tire of the vehicle and the aerodynamic actuator is associated with the front of the vehicle.

In further features, the tire is a rear tire of the vehicle and the aerodynamic actuator is associated with the rear of the vehicle.

In further features: the utilization module further, based on a second longitudinal force on a second tire and a second latitudinal force on the second tire, determines a second utilization force on the second tire of the vehicle and a second direction of the second utilization force; the maximum module further, based on the second direction of the second utilization force, determines a second maximum force of the second tire for maintaining traction between the second tire and a second road surface contacting the second tire; the difference module further determines a second difference between the second utilization force on the second tire of the vehicle and the second maximum force of the second tire; and the actuator control module selectively adjusts the position of the aerodynamic actuator based on the difference when the difference is greater than the second difference.

In further features, the actuator control module adjusts the position of the aerodynamic actuator based on the second difference when the second difference is greater than the difference.

In further features, a capacity module determines a force capacity of the tire based on a downforce on the tire and the direction of the utilization force, and the tire slips relative to the road surface when the utilization force on the tire is greater than the force capacity of the tire. An adjustment module determines a force adjustment based on the force capacity, and the maximum module sets the maximum force of the tire to less than the force capacity of the tire based on the force adjustment.

In further features, the maximum module sets the maximum force based on the force capacity of the tire multiplied by the force adjustment.

In further features, the maximum module sets the maximum force based on the force capacity of the tire minus the force adjustment.

In a feature, an aerodynamic control method for a vehicle includes: based on a longitudinal force on a tire in a longitudinal direction and a latitudinal force on the tire in a latitudinal direction, determining a utilization force on the tire of the vehicle and a direction of the utilization force; based on the direction of the utilization force, determining a maximum force of the tire for maintaining traction between the tire and a road surface contacting the tire; determining a difference between the utilization force on the tire of the vehicle and the maximum force on the tire; and selectively adjusting a position of an aerodynamic actuator of the vehicle based on the difference.

In further features, selectively adjusting the position includes adjusting the position of the aerodynamic actuator toward a fully open position when the difference indicates that the utilization force on the tire is greater than the maximum force of the tire, and the aerodynamic actuator increases downforce on the tire when the position of the aerodynamic actuator moves toward the fully open position.

In further features, selectively adjusting the position includes adjusting the position of the aerodynamic actuator toward a closed position when the difference indicates that the maximum force of the tire is greater than the utilization force of the tire, and the actuator decreases downforce on the tire when the position of the aerodynamic actuator moves toward the closed position.

In further features, the tire is a front tire of the vehicle and the aerodynamic actuator is associated with the front of the vehicle.

In further features, the tire is a rear tire of the vehicle and the aerodynamic actuator is associated with the rear of the vehicle.

In further features the aerodynamic control method further includes: based on a second longitudinal force on a second tire and a second latitudinal force on the second tire, determining a second utilization force on the second tire of the vehicle and a second direction of the second utilization force; based on the second direction of the second utilization force, determining a second maximum force of the second tire for maintaining traction between the second tire and a second road surface contacting the second tire; and determining a second difference between the second utilization force on the second tire of the vehicle and the second maximum force of the second tire. Selectively adjusting the position includes adjusting the position of the aerodynamic actuator based on the difference when the difference is greater than the second difference.

In further features, selectively adjusting the position includes adjusting the position of the aerodynamic actuator based on the second difference when the second difference is greater than the difference.

In further features, the aerodynamic control method further includes: determining a force capacity of the tire based on a downforce on the tire and the direction of the utilization force, wherein the tire slips relative to the road surface when the utilization force on the tire is greater than the force capacity of the tire; and determining a force adjustment based on the force capacity. Determining the maximum force includes setting the maximum force of the tire to less than the force capacity of the tire based on the force adjustment.

In further features, determining the maximum force includes setting the maximum force based on the force capacity of the tire multiplied by the force adjustment.

In further features, determining the maximum force includes setting the maximum force based on the force capacity of the tire minus the force adjustment.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An aerodynamic control module (ACM) controls actuation of one or more aerodynamic actuators of a vehicle. Examples of aerodynamic actuators may include adjustable rear spoilers, adjustable rear diffusers, adjustable chin spoilers, adjustable hood louvers, and other types of actuators that move to change vehicle aerodynamics. The ACM controls the aerodynamic actuator(s) based on target downforce values for respective tires of the vehicle.

As downforce at a tire increases, grip of that tire increases. Conversely, as downforce at a tire decreases, grip of that tire decreases. Downforce in excess of that needed to maintain tire grip, however, increases fuel consumption. The ACM therefore controls one or more aerodynamic actuators associated with a tire to maintain grip of that tire while minimizing downforce.

Figure 1:
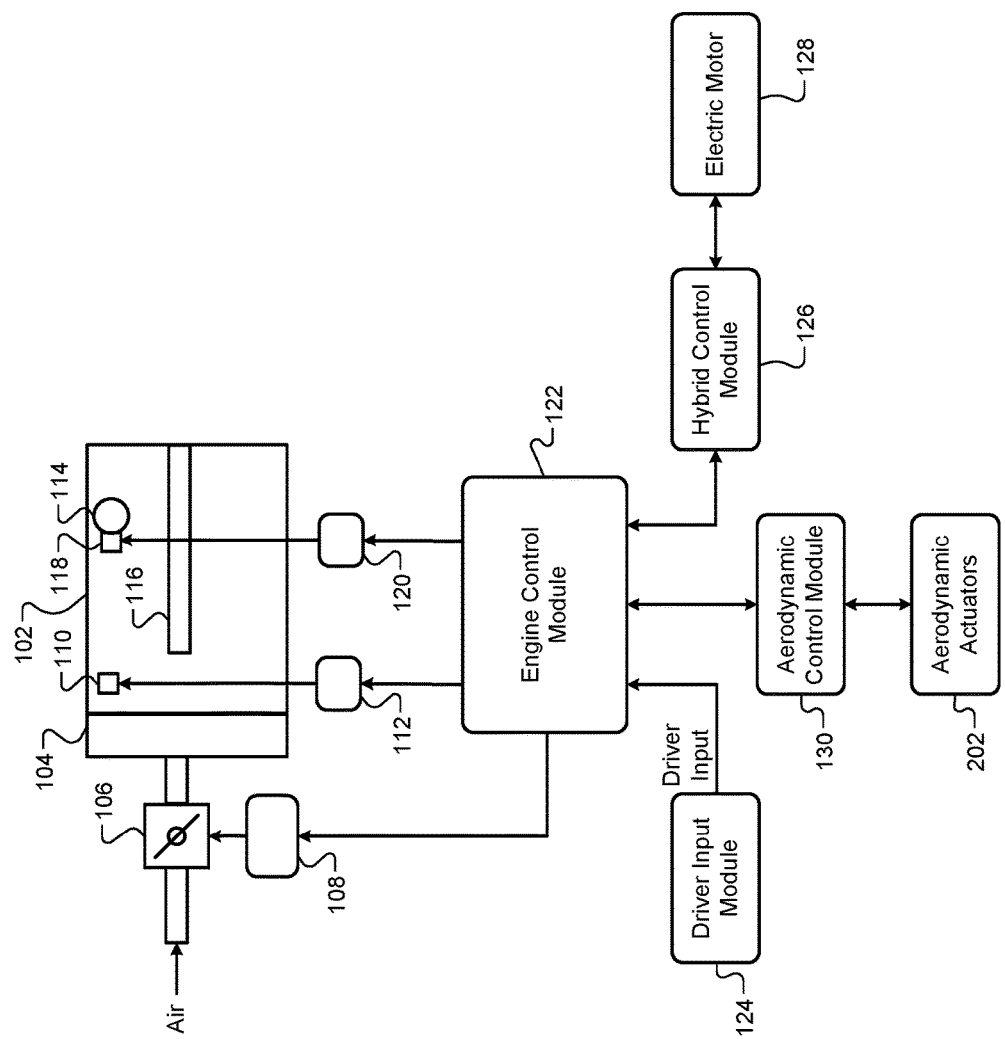
FIG. 1 is a functional block diagram of an example engine control system.

Referring now to FIG. 1, a functional block diagram of an example engine control system is presented. An engine 102 generates drive torque for a vehicle. Air is drawn into the engine 102 through an intake manifold 104. Airflow into the intake manifold 104 may be varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injector(s).

A cylinder 114 includes a piston (not shown) that is coupled to a crankshaft 116. Although the engine 102 is depicted as including only the cylinder 114, the engine 102 may include more than one cylinder. One combustion cycle of the cylinder 114 may include four strokes: an intake stroke, a compression stroke, an expansion stroke, and an exhaust stroke. One engine cycle includes each of the cylinders undergoing one combustion cycle. While a four-stroke combustion cycle is provided as an example, another suitable operating cycle may be used. A spark plug 118 may ignite the air/fuel mixture in various types of engines. A spark actuator module 120 controls the spark plug 118.

An engine control module (ECM) 122 regulates operation of the engine 102 to achieve a requested amount of torque. For example, the ECM 122 may regulate opening of the throttle valve 106, amount and timing of fuel injection, spark timing, camshaft phasing, lift mode, and other engine operating parameters based on the requested amount of torque.

The ECM 122 may determine the requested amount of torque based on, for example, driver input from a driver input module 124, such as an accelerator pedal position, a brake pedal position, a clutch pedal position, and/or one or more other driver inputs. Another type of driver input may include autonomous vehicle input(s).

The ECM 122 may communicate with a hybrid control module 126 to coordinate operation of the engine 102 and an electric motor 128. The electric motor 128 may also function as a generator, and may be used to produce electrical energy for use by vehicle electrical systems and/or for storage in a battery. While only the electric motor 128 is shown and discussed, zero or multiple electric motors may be implemented in various types of vehicles.

The ECM 122 may also communicate with an aerodynamic control module (ACM) 130. The ACM 130 controls an operation of one or more aerodynamic actuators 202, as discussed further below.

Figure 2:
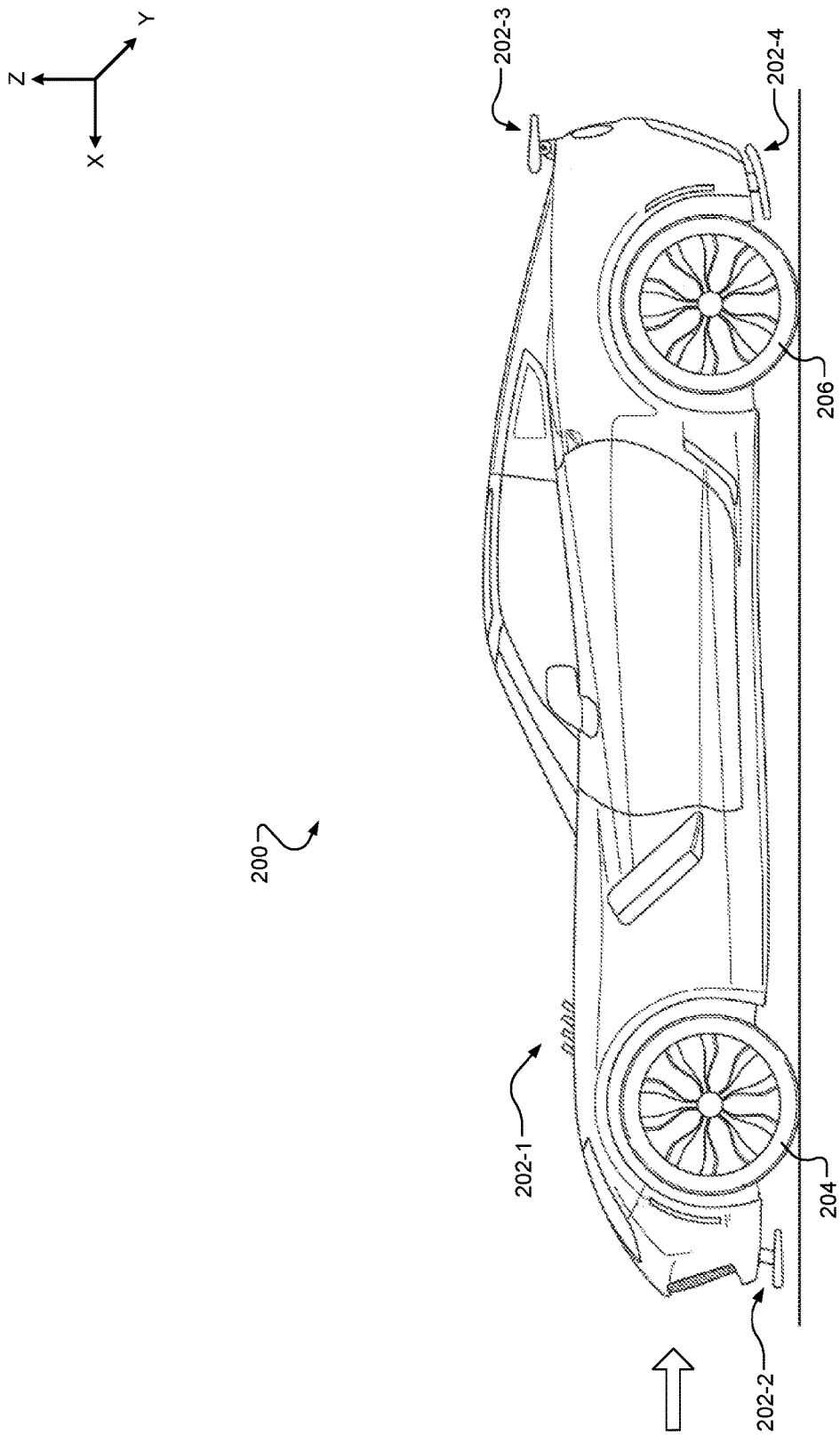
FIG. 2 is a schematic side profile of an example vehicle including aerodynamic actuators.

FIG. 2 is a schematic side profile of an example vehicle 200 including aerodynamic actuators. The vehicle 200 may generally travel along an x-direction and experiences forces in the x-direction, longitudinal to the vehicle body. The vehicle 200 may also experiences lateral forces in the y-direction, for example, during corning. The vehicle 200 also experiences lift and downforce in the z-direction. Lift may refer to forces on the vehicle in the positive z direction, while downforce may refer to forces in the negative z direction.

The vehicle 200 includes one or more aerodynamic actuators 202, such as a front upper adjustable aerodynamic actuator 202-1 (e.g., adjustable hood louvers), a front lower adjustable aerodynamic actuator 202-2 (e.g., adjustable chin spoiler or splitter), a rear upper adjustable aerodynamic actuator (e.g., adjustable rear spoiler), and a rear lower adjustable aerodynamic actuator (e.g., adjustable rear diffuser). The front upper adjustable aerodynamic actuator 202-1 and the front lower adjustable aerodynamic actuator 202-2 are collectively referred to as front aerodynamic actuator. The rear upper adjustable aerodynamic actuator 202-3 and the rear lower adjustable aerodynamic actuator 202-4 are collectively referred to as rear aerodynamic actuators.

Each of the aerodynamic actuators 202 may be individually adjusted between a closed position (e.g., 0 percent) and fully open position (e.g., 100 percent). When in the closed position, an aerodynamic actuator not increase downforce relative to when the aerodynamic actuator is at least partially open (e.g., 1-100 percent). As that aerodynamic actuator opens from the closed position toward the fully open position, downforce attributable to that aerodynamic actuator may increase, although the relationship may be non-linear. This relationship may be applicable to each of the aerodynamic actuators 202. The one or more aerodynamic actuators 202 are actuatable to vary downforce and lift on the vehicle. For example, the rear aerodynamic actuators are actuatable to vary downforce and lift on a rear portion of the vehicle, while the front aerodynamic actuators are actuatable to vary downforce and lift on a front portion of the vehicle.

The vehicle 200 includes a pair of front wheels, such as front wheel 204 and a pair of rear wheels, such as rear wheel 206. The vehicle 200 may be configured such that the rear wheels and/or the front wheels are driven to propel the vehicle 200 in the x-direction. In the case of a four wheeled vehicle, the pair of front wheels includes a left front wheel (LF) and a right front wheel (RF). Similarly, the pair of rear wheels includes a left rear wheel (LR) and a right rear wheel (RR). Although the example of a four wheeled vehicle is provided, a vehicle may include fewer or greater number of wheels.

Figure 3:
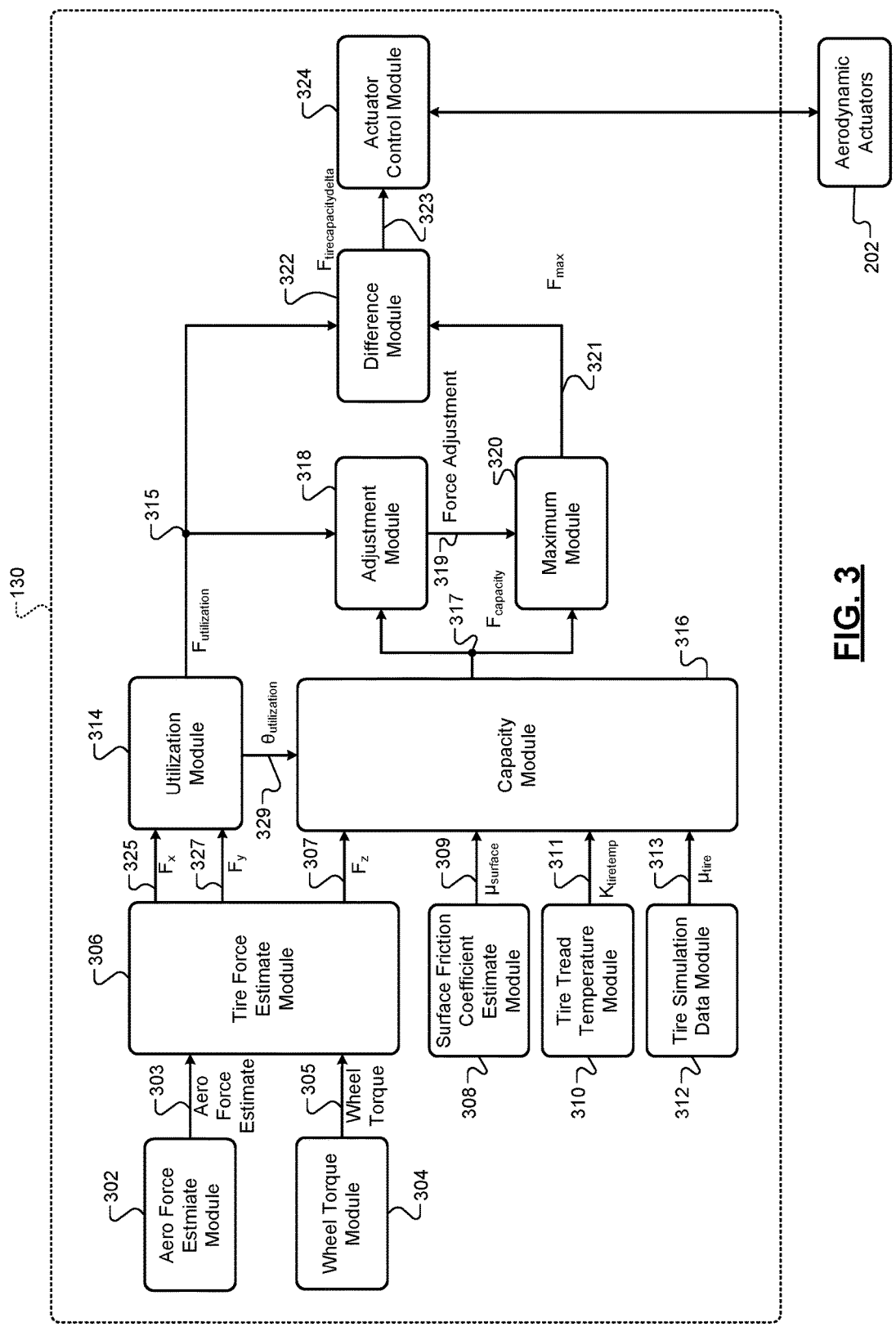
FIG. 3 is a functional block diagram of an example aerodynamic control module.

Referring now to FIG. 3, a functional block diagram of an example implementation of the ACM 130 is presented. The ACM 130 includes an aero force estimate module 302, a wheel torque module 304, a tire force estimate module 306, a surface friction coefficient estimate module 308, a tire tread temperature module 310, a tire simulation data module 312, a utilization module 314, a capacity module 316, an adjustment module 318, a maximum module 320, a difference module 322, and an actuator control module 324.

The aero force estimate module 302 may determine an aero force estimate 303 based on a first one or more inputs, such as an aerodynamic position indicator, a vehicle speed, a vehicle ride height, an air density, a vehicle roll, and a vehicle pitch. The aero force estimate module 302 may determine the aero force estimate 303 using one or more equations and/or lookup tables that relate the first input(s) to aero force estimate. The aero force estimate 303 is the aerodynamic force on the vehicle 200 in the z-direction. The aero force estimate 303 includes (i) an aero force estimate for the front wheels 204 and (ii) an aero force estimate for the rear wheels 206. The aero force estimate for the front wheels 204 corresponds to a current downforce (in the z-direction) for the front wheels 204 of the vehicle 200. The aero force estimate for the rear wheels 206 corresponds to a current downforce (in the z-direction) for the rear wheels 206 of the vehicle 200.

The aerodynamic position indicator may include and be determined based on a position of one or more of the aerodynamic actuators 202 of the vehicle. For example, in terms of the aerodynamic position indicator used to determine the aero force estimate 303 for the front wheels 204, an average position of the front aerodynamic actuators or a greatest open one of the positions of the front aerodynamic actuators may be used. Positions of the front aerodynamic actuators may be measured using sensors. Alternatively, commanded openings of the front aerodynamic actuators may be used. The aero force estimate 303 for the rear wheels 206 may be determined based on an average of the rear aerodynamic actuators or a greatest open one of the positions of the rear aerodynamic actuators as the aerodynamic position indicator. Positions of the rear aerodynamic actuators may be measured using sensors. Alternatively, commanded openings of the rear aerodynamic actuators may be used.

The vehicle speed may be measured or determined using one or more other measured parameters. For example, vehicle speed may be determined based on two or more measured wheel speeds. The vehicle ride height includes a front ride height for the front wheels 204 and a rear ride height for the rear wheels 206. The front and rear ride heights may be measured or determined using one or more other measured parameters. For example, a vehicle ride height may be determined as the distance between a point on vehicle body and ground.

The air density may be measured or determined using one or more other measured parameters. The vehicle roll may be measured or determined using one or more other measured parameters. For example, vehicle roll may be provided and determined by a chassis control module (not shown). The vehicle pitch may be measured or determined using one or more other measured parameters. For example, vehicle pitch may be provided and determined by the chassis control module.

The wheel torque module 304 may determine a wheel torque 305 for each wheel based on a second one or more inputs, such as a chassis brake axle torque, an axle drive torque, and a rear differential coupling indicator for a given wheel. The wheel torque module 304 may determine the wheel torque 305 using one or more equations and/or lookup tables that relate the second input(s) to wheel torque 305. The chassis total brake axle torque may be a present brake torque at a front or rear axle associated with that wheel. The wheel torque module 304 may receive the chassis total brake axle torque from an electronic brake control module (not shown). The chassis total brake torque may be measured or determined using one or more other measured parameters. For example, the electronic brake control module may set the chassis total brake torque based on or equal to a sum of an estimated torque at each wheel. For a given wheel, the axle drive torque is an amount of torque generated by the engine 102 that is applied to the front or rear axle associated with that wheel. The wheel torque module 304 may receive the axle drive torque from the ECM 122. The axle drive torque may be measured or determined using one or more other measured parameters. The rear differential coupling indicator determines a rear differential coupling between a locked state and unlocked state. The wheel torque module 304 may receive the rear differential coupling indicator from a rear drive control module (not shown). The rear differential coupling indicator may be measured or determined using one or more measured parameters, estimated parameters, and/or other parameters. Although the rear differential coupling indicator is discussed, the wheel torque module 304 may receive additional inputs, such as a front differential coupling indicator (e.g., in a front wheel drive vehicle) or a center differential coupling indicator (e.g., in an all-wheel drive vehicle).

For each tire, the tire force estimate module 306 may determine a x-direction (longitudinal) tire force estimate ($F_x$) 325 on that tire, a y-direction (latitudinal) tire force estimate ($F_y$) 327 on that tire, and a z-direction tire force estimate ($F_z$) 307 on that tire based on a third one or more inputs. For a tire, the third one or more inputs may include the aero force estimate 303, the wheel torque 305 of the wheel associated with that tire, a vehicle acceleration, a slip angle at the portion (front or rear) of the vehicle associated with that tire, a vehicle yaw rate, and a wheel acceleration of the wheel associated with that tire. The tire force estimate module 306 may determine the x-direction tire force estimate $F_x$ 325 using one or more equations and/or lookup tables that relate the third input(s) to x-direction tire force estimate $F_x$ 325. The tire force estimate module 306 may also determine the y-direction tire force estimate $F_y$ 327 using one or more equations and/or lookup tables that relate the third input(s) to y-direction tire force estimate $F_y$ 327. Similarly, the tire force estimate module 306 may determine the z-direction tire force estimate $F_z$ 307 using one or more equations and/or lookup tables that relate the third input(s) to z-direction tire force estimate $F_z$ 307. For the tires of the front wheels 204 of the vehicle, the tire force estimate module 306 uses the aero force estimate 303 for the front wheels 204. For the tires of the rear wheels 206 of the vehicle, the tire force estimate module 306 uses the aero force estimate 303 for the rear wheels 206.

The vehicle acceleration may include a first value for lateral (y-direction) acceleration of the vehicle 200 and a second value for longitudinal (x-direction) acceleration of the vehicle 200. The vehicle acceleration may be measured using one or more sensors (e.g., accelerometers) or determined, for example, by the ECM 122. The slip angle be measured using one or more sensors or determined, for example, by the ECM 122. The slip angle may include a first value for the front wheels 204 and a second value for the rear wheels 206. The tire force estimate module 306 uses the first value for the front wheels 204 for the tires of the front wheels 204 of the vehicle 200. The tire force estimate module 306 uses the second value for the rear wheels 206 for the tires of the rear wheels 206 of the vehicle 200. The vehicle yaw rate may be measured using one or more sensors or determined, for example, by the ECM 122. The wheel acceleration may be measured, for example, using one or more wheel speed sensors per wheel or determined based on one or more other parameters.

For each tire, the utilization module 314 may determine a utilization force ($F_{utilization}$) 315 (e.g., in Newtons (N)) and a utilization angle ($\theta_{utilization}$) 329 based on a fourth one or more inputs, such as the x-direction tire force estimate $F_x$ 325 of that tire and the y-direction tire force estimate $F_y$ 327 of that tire. The utilization module 314 may determine the utilization force $F_{utilization}$ 315 using one or more equations and/or lookup tables that relate the fourth input(s) to utilization force $F_{utilization}$. The utilization module 314 may determine the utilization angle $\theta_{utilization}$ 329 using one or more equations and/or lookup tables that relate the fourth input(s) to utilization angle $\theta_{utilization}$. The utilization force $F_{utilization}$ 315 of a tire may correspond to a vector having a length indicative of the forces (in the x and y-directions) acting on the tire at a given moment. The utilization angle $\theta_{utilization}$ 329 of a tire is an angle (relative to a reference, such as the x-direction or the y-direction) of the estimated forces acting on that tire at a given moment. The vector of the utilization force $F_{utilization}$ 315 of a tire may be drawn, relative to the reference, at the utilization angle $\theta_{utilization}$ 329 of the tire. For example only, the utilization module 314 may determine the utilization force $F_{utilization}$ 315 of a tire and the utilization angle $\theta_{utilization}$ 329 of the tire using the equations:

$$|F_{utilization}| = \sqrt{F_x^2 + F_y^2}, \text{ and} \qquad (1)$$

$$\theta_{utilization} = \tan^{-1}\left(\frac{F_y}{F_x}\right), \qquad (2)$$

where $F_{utilization}$ is the utilization force 315 of the tire, $F_x$ is the x-direction tire force estimate 325 of the tire, $F_y$ is the y-direction tire force estimate 327 of the tire, and $\theta_{utilization}$ is the utilization angle 329 of the tire.

As one example, for the LF wheel, the utilization module 314 receives the x-direction tire force estimate $F_x$ 325 and the y-direction tire force estimate $F_y$ 327 for the LF wheel. The utilization module 314 may determine the utilization force $F_{utilization}$ 315 of the LF wheel and utilization angle $\theta_{utilization}$ 329 of the LF wheel using equations (1) and (2), as described above. The utilization module 314 may determine the utilization force $F_{utilization}$ 315 and the utilization angle $\theta_{utilization}$ 329 for each of the remaining wheels (e.g., RF, LR, and RR) using their respective x-direction tire force estimate $F_x$ 325 and y-direction tire force estimate $F_y$ 327. As discussed further below, the utilization force $F_{utilization}$ 315 of the tires will be compared with capacities (e.g., maximum road holding forces) of the tires, respectively, to determine whether and/how to actuate one or more aerodynamic actuators to adjust downforce.

The surface friction coefficient estimate module 308 may determine a coefficient of friction ($\mu_{surface}$) 309 for each tire. The coefficient of friction $\mu_{surface}$ 309 of a tire corresponds to a coefficient of friction between that tire and a road surface contacting that tire. The coefficient of friction $\mu_{surface}$ 309 may be measured or determined from one or more other measured parameters. The coefficient of friction $\mu_{surface}$ 309 may vary based on a surface type, where a wet or icy surface produces a lower value than a dry surface.

The tire tread temperature module 310 may determine a tire temperature ($K_{tiretemp}$) 311 for each tire. The tire temperature $K_{tiretemp}$ 311 may be measured or determined from one or more other measured parameters. The tire simulation data module 312 may determine a tire coefficient ($\mu_{tire}$) 313 based on characteristics and properties under certain testing conditions. The tire simulation data module 312 may determine the tire coefficient $\mu_{tire}$ 313 using one or more equations and/or lookup tables that relate the characteristics, properties, and one or more operating condition(s) to tire coefficient $\mu_{tire}$. The tire simulation data module 312 may determine the tire coefficient $\mu_{tire}$ 313, for example, using MF-Tyre, MF-Swift, or another suitable type of tire analysis.

The capacity module 316 may determine a force capacity ($F_{capacity}$) 317 (e.g., in Newtons (N)) for each tire based on a fifth one or more inputs. The force capacity $F_{capacity}$ 317 of a tire may correspond to utilization force $F_{utilization}$ at that tire above which the tire may slip (and lose traction) relative to the road surface. When the utilization force $F_{utilization}$ 315 of a tire is less than the force capacity $F_{capacity}$ 317 of the tire, the tire may maintain traction with the road surface (slip between the tire and the road surface may be approximately zero). The fifth input(s) for a tire may include, for example, the utilization angle $\theta_{utilization}$ 329 of that tire, the z-direction tire force estimate $F_z$ 307 of that tire, the coefficient of friction $\mu_{surface}$ 309 of that tire, the tire temperature $K_{tiretemp}$ 311 of that tire, and the tire coefficient $\mu_{tire}$ 313 of that tire.

The capacity module 316 may determine the force capacity $F_{capacity}$ 317 of a tire using one or more equations and/or lookup tables that relate the fifth input(s) to force capacity $F_{capacity}$ for that tire. For example, the capacity module 316 may determine the force capacity $F_{capacity}$ 317 of a tire using the equation:

$$F_{capacity}(\theta) = \frac{F_{max,x} \times F_{max,y}}{((F_{max,x} \times \cos\theta)^n + (F_{max,y} \times \sin\theta)^n)^{\frac{1}{n}}}, \quad (3)$$

where $$F_{max,x} = F_{z,with\_aero} \times \mu_{surface} \times K_{tiretemp} \times \mu_{tire,x}, \text{ and} \quad (4)$$

$$F_{max,y} = F_{z,with\_aero} \times \mu_{surface} \times K_{tiretemp} \times \mu_{tire,y}, \quad (5)$$

where $F_{capacity}(\theta)$ is the force capacity $F_{capacity}$ 317 of the tire, $\theta$ is the utilization angle $\theta_{utilization}$ 329 of the tire, $F_{z,with\_aero}$ is the z-direction tire force estimate $F_z$ 307 of the tire, $\mu_{surface}$ is the coefficient of friction 309 of the tire, $K_{tiretemp}$ is the tire temperature 311 of the tire, $\mu_{tire,x}$ the tire coefficient 313 in the x-direction of the tire, $\mu_{tire,y}$ is the tire coefficient 313 in the y-direction of the tire, $F_{max,x}$ may correspond to a maximum amount of force at the tire in the x-direction possible while maintaining traction, $F_{max,y}$ may correspond to a maximum force at the tire in the y-direction possible while maintaining traction, and n is a predetermined value. n is a calibrated value and may be set such that, if the force capacity $F_{capacity}$ was determined all or a sufficiently large number of values of $\theta$ using the example equations (5) or (6), the force capacity $F_{capacity}$ would form a super-ellipse around the intersection of the x and y axes.

The capacity module 316 may alternatively determine the force capacity $F_{capacity}$ for a tire using the equation:

$$F_{capacity}(\theta) = K_{tiretemp} \times F_Z - \frac{1}{2}F_{z,aerocurrent} + \frac{1}{2}F_{z,PL} \times \frac{\mu_{tire,x} \times \mu_{tire,y}}{((\mu_{tire,x} \times \cos\theta)^n + (\mu_{tire,y} \times \sin\theta)^n)^{\frac{1}{n}}}, \quad (6)$$

where $F_{capacity}(\theta)$ is the force capacity $F_{capacity}$ 317 of a tire, $\theta$ is the utilization angle $\theta_{utilization}$ 329 of that tire, $F_{z,aerocurrent}$ is the aero force estimate 303 of that tire, $K_{tiretemp}$ is the tire temperature 311 of that tire, $F_z$ is the z-direction tire force estimate 307 of that tire, $\mu_{tire,x}$ is the tire coefficient 313 in the x-direction of that tire, $\mu_{tire,y}$ is the tire coefficient 313 in the y-direction of that tire. n is described above. $F_{z,PL}$ is a z-direction downforce of that tire when the front and rear aerodynamic actuators 202 are in the closed position.

The adjustment module 318 may determine a force adjustment 319 for each tire based on a sixth one or more inputs, such as the utilization force $F_{utilization}$ 315 of that tire and the vehicle speed. The adjustment module 318 may determine the force adjustment 319 using one or more equations and/or lookup tables that relate the sixth input(s) to adjustment. The force adjustment 319 of a tire may be a scalar value or an offset value that is used to produce a force less than the force capacity $F_{capacity}$ 317 such that aerodynamic force is adjusted before traction is lost, as discussed further below. For example, the force adjustment 319 (scalar value) for a tire may be determined using the equation:

$$K_{adj} = f\left(\frac{dF_{utilization}}{dt}, v_x\right), \quad (7)$$

where $K_{adj}$ is a scalar value of the force adjustment 319 of the tire (e.g., between 0.0 and 1.0, non-inclusive), $F_{utilization}$ is the utilization force 315 of that tire, and $V_x$ is the vehicle speed in the x-direction. As discussed further below, scalar values of the force adjustment 319 are multiplied with the force capacity $F_{capacity}$ 317 to obtain a force value that is less than the force capacity $F_{capacity}$ 317.

In the case of an offset value, the adjustment module 318 may determine the force adjustment 319 of a tire further based on the force capacity $F_{capacity}$ 317 of that tire. For example, the force adjustment 319 (offset value) for a tire may be determined using the equation:

$$F_{adj} = f\left(\frac{dF_{utilization}}{dt}, v_x, F_{capacity}(\theta)\right), \quad (8)$$

where $F_{adj}$ is an offset value (e.g., in N) of the force adjustment 319 of the tire (e.g., greater than 0 and less than the force capacity $F_{capacity}$ 317, $F_{utilization}$ is the utilization force 315 of that tire, $V_x$ is the vehicle speed in the x-direction, and $F_{capacity}(\theta)$ is the force capacity $F_{capacity}$ 317 of that tire.

The maximum module 320 may determine a maximum force ($F_{max}$) 321 (e.g., in N) for each tire based on a seventh one or more inputs, such as the force capacity $F_{capacity}$ 317 of that tire and the force adjustment 319 of that tire. The maximum module 320 may determine the maximum force $F_{max}$ 321 using one or more equations and/or lookup tables that relate the seventh input(s) to maximum force. The maximum force 321 may be a maximum target value for the utilization force above which the tire may lose traction.

For example, in the case of the force adjustment 319 being a scalar value, the maximum module 320 may determine the maximum force $F_{max}$ 321 of a tire by multiplying the force adjustment 319 of that tire with the force capacity $F_{capacity}$ 317 of that tire using the equation:

$$F_{max} = K_{adj} \times F_{capacity}(\theta), \quad (9)$$

where $F_{max}$ is the maximum force $F_{max}$ 321 of a tire, $K_{adj}$ is the scalar value of the force adjustment 319 of that tire, and $F_{capacity}(\theta)$ is the force capacity $F_{capacity}$ 317 of that tire. In the case of the force adjustment 319 being an offset value, the maximum module 320 may determine the maximum force $F_{max}$ 321 of a tire by subtracting the force adjustment 319 of that tire from the force capacity $F_{capacity}$ 317 of that tire using the equation:

$$F_{max} = F_{capacity}(\theta) - F_{adj}, \quad (10)$$

where $F_{max}$ is the maximum force 321 of a tire, Fadj is the offset value of the force adjustment 319 of that tire, and $F_{capacity}(\theta)$ is the force capacity $F_{capacity}$ 317 of that tire.

The difference module 322 may determine a tire capacity delta ($F_{tirecapacitydelta}$) 323 for each tire based on an eighth one or more inputs, such as the utilization force $F_{utilization}$ 315 of that tire and the maximum force $F_{max}$ 321 of that tire. The tire capacity delta $F_{tirecapacitydelta}$ 323 is used to determine whether to adjust the position of one or more of the aerodynamic actuators 202 associated with that tire or to maintain the current position of one or more of the aerodynamic actuators 202 associated with that tire.

The difference module 322 may determine the tire capacity delta $F_{tirecapacitydelta}$ 323 using one or more equations and/or lookup tables that relate the eighth input(s) to tire capacity delta $F_{tirecapacitydelta}$ 323. For example, the difference module 322 may determine the tire capacity delta $F_{tirecapacitydelta}$ 323 of a tire based on the difference between the utilization force $F_{utilization}$ 315 of that tire and the maximum force $F_{max}$ 321 of that tire, such as using the equation:

$$F_{tirecapacitydelta} = F_{utilization} - F_{max}, \quad (11)$$

where $F_{tirecapacitydelta}$ is the tire capacity delta 323 of a tire, $F_{utilization}$ is the utilization force 315 of that tire, and $F_{max}$ is the maximum force 321 of that tire.

The difference module 322 may alternatively determine the tire capacity delta $F_{tirecapacitydelta}$ 323 for each tire based on the utilization force $F_{utilization}$ 315 of that tire and the force capacity $F_{capacity}$ 317 of that tire. For example, the difference module 322 may determine the tire capacity delta $F_{tirecapacitydelta}$ 323 of a tire based on the difference between the utilization force $F_{utilization}$ 315 of that tire and the force capacity $F_{capacity}$ 317 of that tire using the equation:

$$F_{tirecapacitydelta} = F_{utilization} - F_{capacity}(\theta), \quad (12)$$

where $F_{tirecapacitydelta}$ is the tire capacity delta 323 of a tire, $F_{utilization}$ is the utilization force 315 of that tire, and $F_{capacity}(\theta)$ is the force capacity $F_{capacity}$ 317 of that tire.

The actuator control module 324 selectively adjusts the position of one or more of the aerodynamic actuators 202 based on the tire capacity delta $F_{tirecapacitydelta}$ 323 for each tire. For example, generally speaking, the actuator control module 324 may determine whether the tire capacity delta $F_{tirecapacitydelta}$ 323 for each tire is positive, negative, or zero. When the tire capacity delta $F_{tirecapacitydelta}$ 323 for a tire is positive, the actuator control module 324 may determine to increase downforce at that tire to increase grip and prevent traction loss of that tire. The actuator control module 324 adjusts the position (e.g., opens) one or more of the aerodynamic actuators 202 associated with that tire to increase the downforce at that tire. When the tire capacity delta $F_{tirecapacitydelta}$ 323 for a tire is negative, the actuator control module 324 may determine to decrease downforce at that tire to decrease aerodynamic drag. The actuator control module 324 adjusts the position (e.g., closes) one or more of the aerodynamic actuators 202 associated with that tire to decrease the downforce at that tire. When the tire capacity delta $F_{tirecapacitydelta}$ 323 for a tire is zero, the actuator control module 324 may maintain the position of the aerodynamic actuators 202 associated with that tire. In various implementations, the adjustments may be in predetermined increments or the adjustments may be determined using closed-loop control (e.g., using one or more of proportional (P), integral (I), and derivative D closed-loop control).

In terms of the front wheels 204, the actuator control module 324 may control one or more of the front aerodynamic actuators. For example, the actuator control module 324 may determine an average of the tire capacity delta $F_{tirecapacitydelta}$ 323 values for the front wheels 204 and position the front aerodynamic actuators based on the average, as discussed above. Alternatively, the actuator control module 324 may determine a maximum (largest) one of the tire capacity delta $F_{tirecapacitydelta}$ 323 values of the front wheels 204 and position the front aerodynamic actuators based on the maximum value. The actuator control module 324 may determine an average of the tire capacity delta $F_{tirecapacitydelta}$ 323 values for the rear wheels 206 and position the rear aerodynamic actuators based on the average, as discussed above. Alternatively, the actuator control module 324 may determine a maximum (largest) one of the tire capacity delta $F_{tirecapacitydelta}$ 323 values of the rear wheels 206 and position the rear aerodynamic actuators based on the maximum value. By controlling the aerodynamic actuators as described above, downforce at each tire is controlled in an effort to maintain traction while also minimizing downforce, for example, to decrease fuel consumption.

Figure 4:
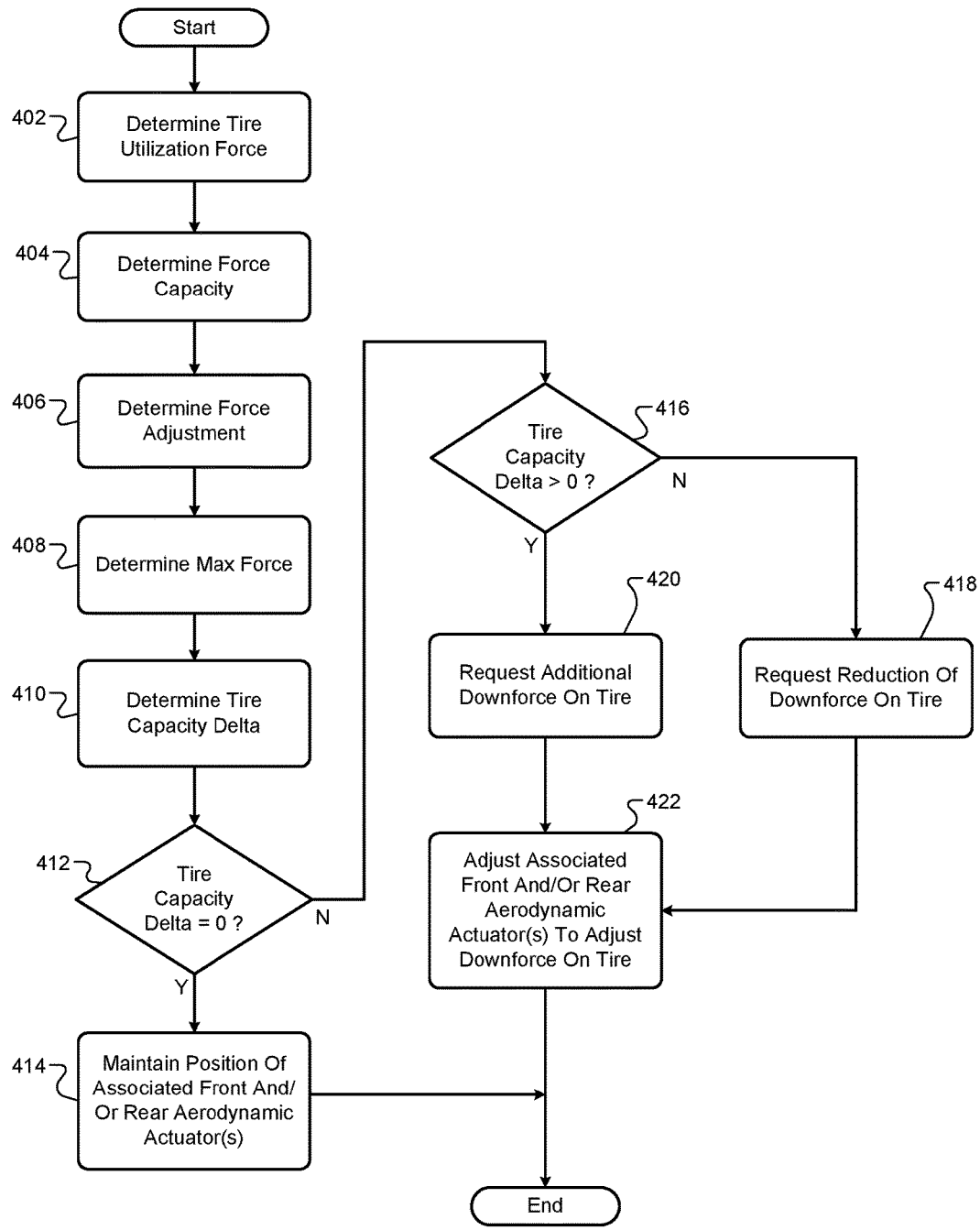
FIG. 4 is a flowchart depicting an example method of controlling one or more aerodynamic actuators of a vehicle based on a tire capacity.

FIG. 4 is a flowchart depicting an example method of controlling a vehicle's aerodynamic actuator(s). While the following will be described in terms of one tire and wheel, the example of FIG. 4 may be executed for each tire and wheel. Also, while one example control loop is shown, control may return to 402.

Control may begin at 402 where the utilization module 314 may determine the utilization force $F_{utilization}$ 315 for a tire and the utilization angle $\theta_{utilization}$ 329 of the tire. The utilization module 314 may determine the utilization force $F_{utilization}$ 315 for the tire and the utilization angle $\theta_{utilization}$ 329 of the tire based on the x-direction tire force estimate $F_x$ 325 of the tire and the y-direction tire force estimate $F_y$ 327 of the tire. For example, the utilization module 314 may determine the utilization force $F_{utilization}$ 315 of the tire and the utilization angle $\theta_{utilization}$ 329 of the tire using equations (1) and (2), as described above.

At 404, the capacity module 316 may determine the force capacity $F_{capacity}$ 317 for the tire based on the utilization angle $\theta_{utilization}$ 329 of the tire, the z-direction tire force estimate $F_x$ 307 of the tire, the coefficient of friction $\mu_{surface}$ 309 of the tire, the tire temperature $K_{tiretemp}$ 311 of the tire, and the tire coefficient $\mu_{tire}$ 313 of the tire. For example, the capacity module 316 may determine the force capacity $F_{capacity}$ 317 of a tire using equations (3)-(5) or (6), as described above.

The adjustment module 318 may determine the force adjustment 319 for the tire at 406. The adjustment module 318 may determine the force adjustment 319 of the tire based on the utilization force $F_{utilization}$ 315 of the tire and the vehicle speed. For example, the adjustment module 318 may determine the force adjustment 319 for a tire using equations (7) or (8), as described above.

The maximum module 320 may determine the maximum force $F_{max}$ 321 for the tire at 408. The maximum module 320 may determine the maximum force $F_{max}$ 321 of the tire based on the force capacity $F_{capacity}$ 317 of the tire and the force adjustment 319 of the tire. For example, the maximum module 320 may determine the maximum force $F_{max}$ 321 for the tire using equation (9) or (10), as described above.

At 410, the difference module 322 may determine the tire capacity delta $F_{tirecapacitydelta}$ 323 for the tire. The difference module 322 may determine the tire capacity delta $F_{tirecapacitydelta}$ 323 of the tire based on a difference between the utilization force $F_{utilization}$ 315 of the tire and the maximum force $F_{max}$ 321 of the tire. For example, the difference module 322 may determine the tire capacity delta $F_{tirecapacitydelta}$ 323 of the tire using equations using equation (11) or (12), as described above.

At 412, control may determine whether the tire capacity delta $F_{tirecapacitydelta}$ 323 of the tire is equal to zero. If true, control continues with 414; if false, control continues with 416. For example, the tire capacity delta $F_{tirecapacitydelta}$ 323 of the tire may be equal to zero when the utilization force $F_{utilization}$ 315 of the tire equals the maximum force $F_{max}$ 321 of the tire or the force capacity $F_{capacity}$ 317 of the tire. At 414, control determines that target downforce values have been achieved and that no adjustments of the front and/or rear aerodynamic actuators 202 are necessary. Control therefore may therefore maintain the current positions of the front and/or rear aerodynamic actuator(s) 202 associated with that wheel at 414.

At 416, when the tire capacity delta $F_{tirecapacitydelta}$ 323 of the tire is not equal to zero, control determines whether the tire capacity delta $F_{tirecapacitydelta}$ 323 of the tire is greater than zero. If false, control continues with 418; if true, control continues with 420. At 418, when the tire capacity delta $F_{tirecapacitydelta}$ 323 of a tire is less than zero, control determines to decrease downforce at the tire. This may decrease aerodynamic drag on the vehicle and, thereby, decrease fuel consumption. Control may therefore request a reduction of downforce at that tire at 418. Control continues with 422, which is discussed further below.

At 420, when the tire capacity delta $F_{tirecapacitydelta}$ 323 of the tire is greater than zero, control determines to increase downforce to increase or maintain grip/traction at the tire. Control may therefore request that downforce be increased at the tire at 420. Control continues with 422. At 422, the actuator control module 324 adjusts the front and/or rear aerodynamic actuators 202 associated with the tire based on the request. For example, the actuator control module 324 may open the front and/or rear aerodynamic actuators 202 (e.g., adjust the position toward or to the fully open position) associated with the tire when an increase in downforce is requested. Conversely, the actuator control module 324 may close the front and/or rear aerodynamic actuators 202 (e.g., adjust the position toward or to the closed position) associated with the tire when a decrease in downforce is requested.

As described above, instead of being based on the tire capacity delta of only the tire, the actuator control module 324 may adjust the associated front and rear aerodynamic actuators 202 based on the greater of the tire capacity delta $F_{tirecapacitydelta}$ 323 values determined for the front wheels and the rear wheels, respectively. For example, the actuator control module 324 may adjust one or more of the front aerodynamic actuators 202 based on the greater one of the tire capacity delta $F_{tirecapacitydelta}$ 323 values of the front wheels/tires. The actuator control module 324 may adjust one or more of the rear aerodynamic actuators 202 based on the greater one of the tire capacity delta $F_{tirecapacitydelta}$ 323 values of the rear wheels/tires.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening actuators are present (either spatially or functionally) between the first and second actuators. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirection arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An aerodynamic control system of a vehicle comprising:
    a utilization module that, based on a longitudinal force on a tire in a longitudinal direction and a latitudinal force on the tire in a latitudinal direction, determines a utilization force on the tire of the vehicle and a direction of the utilization force;
    a maximum module that, based on the direction of the utilization force, determines a maximum force of the tire for maintaining traction between the tire and a road surface contacting the tire;
    a difference module that determines a difference between the utilization force on the tire of the vehicle and the maximum force on the tire; and
    an aerodynamic actuator control module that selectively adjusts a position of an aerodynamic actuator of the vehicle based on the difference.

2. The aerodynamic control system of claim 1 wherein the aerodynamic actuator control module adjusts the position of the aerodynamic actuator toward a fully open position when the difference indicates that the utilization force on the tire is greater than the maximum force of the tire,
    wherein the aerodynamic actuator increases downforce on the tire when the position of the aerodynamic actuator moves toward the fully open position.

3. The aerodynamic control system of claim 2 wherein the aerodynamic actuator control module adjusts the position of the aerodynamic actuator toward a closed position when the difference indicates that the maximum force of the tire is greater than the utilization force of the tire,
    wherein the aerodynamic actuator decreases downforce on the tire when the position of the aerodynamic actuator moves toward the closed position.

4. The aerodynamic control system of claim 1 wherein the tire is a front tire of the vehicle and the aerodynamic actuator is associated with the front of the vehicle.

5. The aerodynamic control system of claim 1 wherein the tire is a rear tire of the vehicle and the aerodynamic actuator is associated with the rear of the vehicle.

6. The aerodynamic control system of claim 1 wherein:
    the utilization module further, based on a second longitudinal force on a second tire and a second latitudinal force on the second tire, determines a second utilization force on the second tire of the vehicle and a second direction of the second utilization force;
    the maximum module further, based on the second direction of the second utilization force, determines a second maximum force of the second tire for maintaining traction between the second tire and a second road surface contacting the second tire;
    the difference module further determines a second difference between the second utilization force on the second tire of the vehicle and the second maximum force of the second tire; and
    the aerodynamic actuator control module selectively adjusts the position of the aerodynamic actuator based on the difference when the difference is greater than the second difference.

7. The aerodynamic control system of claim 6 wherein the aerodynamic actuator control module adjusts the position of the aerodynamic actuator based on the second difference when the second difference is greater than the difference.

8. The aerodynamic control system of claim 1 further comprising:
    a capacity module that determines a force capacity of the tire based on a downforce on the tire and the direction of the utilization force, wherein the tire slips relative to the road surface when the utilization force on the tire is greater than the force capacity of the tire; and an adjustment module that determines a force adjustment based on the force capacity, wherein the maximum module sets the maximum force of the tire to less than the force capacity of the tire based on the force adjustment.

9. The aerodynamic control system of claim 8 wherein the maximum module sets the maximum force based on the force capacity of the tire multiplied by the force adjustment.

10. The aerodynamic control system of claim 8 wherein the maximum module sets the maximum force based on the force capacity of the tire minus the force adjustment.

11. A control method for a vehicle comprising:

based on a longitudinal force on a tire in a longitudinal direction and a latitudinal force on the tire in a latitudinal direction, determining a utilization force on the tire of the vehicle and a direction of the utilization force;

based on the direction of the utilization force, determining a maximum force of the tire for maintaining traction between the tire and a road surface contacting the tire;

determining a difference between the utilization force on the tire of the vehicle and the maximum force on the tire; and selectively adjusting a position of an aerodynamic actuator of the vehicle based on the difference.

12. The control method of claim 11 wherein selectively adjusting the position includes adjusting the position of the aerodynamic actuator toward a fully open position when the difference indicates that the utilization force on the tire is greater than the maximum force of the tire, wherein the aerodynamic actuator increases downforce on the tire when the position of the aerodynamic actuator moves toward the fully open position.

13. The control method of claim 12 wherein selectively adjusting the position includes adjusting the position of the aerodynamic actuator toward a closed position when the difference indicates that the maximum force of the tire is greater than the utilization force of the tire, wherein the aerodynamic actuator decreases downforce on the tire when the position of the aerodynamic actuator moves toward the closed position.

14. The control method of claim 11 wherein the tire is a front tire of the vehicle and the aerodynamic actuator is associated with the front of the vehicle.

15. The control method of claim 11 wherein the tire is a rear tire of the vehicle and the aerodynamic actuator is associated with the rear of the vehicle.

16. The control method of claim 11 further comprising:

based on a second longitudinal force on a second tire and a second latitudinal force on the second tire, determining a second utilization force on the second tire of the vehicle and a second direction of the second utilization force;

based on the second direction of the second utilization force, determining a second maximum force of the second tire for maintaining traction between the second tire and a second road surface contacting the second tire; and determining a second difference between the second utilization force on the second tire of the vehicle and the second maximum force of the second tire, wherein selectively adjusting the position includes adjusting the position of the aerodynamic actuator based on the difference when the difference is greater than the second difference.

17. The control method of claim 16 wherein selectively adjusting the position includes adjusting the position of the aerodynamic actuator based on the second difference when the second difference is greater than the difference.

18. The control method of claim 11 further comprising:

determining a force capacity of the tire based on a downforce on the tire and the direction of the utilization force, wherein the tire slips relative to the road surface when the utilization force on the tire is greater than the force capacity of the tire; and determining a force adjustment based on the force capacity, wherein determining the maximum force includes setting the maximum force of the tire to less than the force capacity of the tire based on the force adjustment.

19. The control method of claim 18 wherein determining the maximum force includes setting the maximum force based on the force capacity of the tire multiplied by the force adjustment.

20. The control method of claim 18 wherein determining the maximum force includes setting the maximum force based on the force capacity of the tire minus the force adjustment.

* * * * *